US012657003B2

(12) United States Patent
Song et al.

(10) Patent No.: US 12,657,003 B2
(45) Date of Patent: Jun. 16, 2026

(54) NEURAL NETWORK ENGINE WITH ASSOCIATED MEMORY ARRAY

(71) Applicant: ANAFLASH INC., Sunnyvale, CA (US)

(72) Inventors: Seung-Hwan Song, Palo Alto, CA (US); Sihwan Kim, San Francisco, CA (US)

(73) Assignee: Anaflash Inc., San Jose, CA (US)

( * ) Notice: Subject to any disclaimer, the term of this patent is extended or adjusted under 35 U.S.C. 154(b) by 1089 days.

(21) Appl. No.: 17/677,772

(22) Filed: Feb. 22, 2022

(65) Prior Publication Data

US 2022/0277190 A1    Sep. 1, 2022

Related U.S. Application Data

(60) Provisional application No. 63/154,747, filed on Feb. 28, 2021.

(51) Int. Cl.
| | |
|---|---|
| *G06F 7/53* | (2006.01) |
| *G06F 7/544* | (2006.01) |
| *G06N 3/063* | (2023.01) |

(52) U.S. Cl.
CPC ............... *G06F 7/53* (2013.01); *G06N 3/063* (2013.01); *G06F 7/5443* (2013.01)

(58) Field of Classification Search
CPC . G06F 7/53–5324; G06F 7/5443; G06N 3/04; G06N 3/0442; G06N 3/063
See application file for complete search history.

(56) References Cited

U.S. PATENT DOCUMENTS

| | | | | |
|---|---|---|---|---|
| 2020/0125931 A1* | 4/2020 | Judd | ...................... | G06N 3/063 |
| 2021/0279036 A1* | 9/2021 | Li | ......................... | G06N 3/0464 |
| 2021/0295905 A1* | 9/2021 | Lee | .................... | G06F 15/7821 |
| 2023/0074229 A1* | 3/2023 | Jia | ....................... | G06F 15/7821 |

* cited by examiner

*Primary Examiner* — Emily E Larocque

(57) ABSTRACT

A neural network engine configured to perform neural network computations. The neural network engine includes a first memory block configured to provide a first operand; a second memory block configured to provide a second operand; a synapse array configured to produce partial products of the first and second operands, wherein the synapse array is located outside of the first and second memory blocks; and, an accumulator array to perform summation of the partial products produced by the synapse array.

19 Claims, 7 Drawing Sheets

100

200

500

600

NEURAL NETWORK ENGINE WITH ASSOCIATED MEMORY ARRAY

CROSS-REFERENCE TO RELATED APPLICATION

This application is based on and claims the benefit of U.S. Provisional Application Ser. No. U.S. 63/154,747, filed on Feb. 28, 2021, entitled. Neural Network Engine Having a Memory, to Which a claim of priority is hereby made and the disclosure of which is incorporated by reference. This invention generally relates to a multiplier circuit and, more particularly, to an improved multiplier circuit implemented with analog circuits.

GOVERNMENT SUPPORT

This invention was made with government support under 80NSSC20C0368 awarded by NASA. The government has certain rights in the invention.

BACKGROUND OF THE INVENTION

1. Field of the Invention

The present invention relates to the field of data processing circuits and more specifically to multiplier circuits. The present invention describes a neural network engine that has a memory macro, a synapse driver, a synapse array, a memory array, and an accumulator array to compute neural network operations efficiently.

2. Description of the Related Art

FIG. 1 is a schematic block diagram of a conventional processor 100 to perform neural network operation such as multiplication and accumulation by a neural network engine. As shown in FIG. 1, a central processing unit (CPU) 102, main memory 104, and a neural network engine 106 are key elements of the neural network engine.

In this computer architecture, those entities are allowed to communicate with each other by exchanging data via a bus. Because the CPU 102 and the neural network engine 106 share the data stored in the main memory 104, the main memory 104 is accessible through a communication protocol between the CPU 102 and the neural network engine 106.

For example, when the CPU 102 is accessing the main memory 104, the neural network engine 106 is restricted to access the main memory 104 according to the protocol. To alleviate this communication overhead in sharing the data in main memory 104, cache memory can be embedded in the CPU 102 and neural network engine 106. Still, then information stored in cache memory should be maintained coherently. Cache information in the CPU 102 should also be known to the neural network engine 106. Similarly, such information in the neural network engine 106 should be provided to the CPU 102, which can also incur communication overhead.

Communication protocol over the bus and cache memory management can degrade the performance of the processor. It is therefore advisable to employ a large amount of memory dedicated to neural network operation and embedded in the neural network engine. As will be seen, the present invention has named such memory as memory macro or memory array in this disclosure.

Note that the neural network computation requires retrieving large amounts of data, and therefore a significantly large amount of communication overhead over the data bus is expected if the capacity of the memory macro or memory array in the neural network engine is not enough, thus requiring frequent access to the main memory. A dense memory macro or memory array embedded in the neural network engine is therefore preferred, while multiplication and accumulation operations are computed area and power efficiently from the neural network engine 106.

SUMMARY OF THE INVENTION

The present invention has been made in view of the above difficulties and problems. The primary object of the present invention is to provide a neural network engine including a dense memory array that is embodied to perform multiplication and accumulation operations power efficiently. Another object of the invention is to improve the performance of neural network operations compared to when a neural network engine needs to frequently access the main memory on a bus of a computer system.

In a general aspect, a neural network engine to perform neural network computations includes: a first memory block configured to provide a first operand; a second memory block configured to provide a second operand; a synapse array configured to produce partial products of the first and second operands, wherein the synapse array is located outside of the first and second memory blocks; and, an accumulator array to perform summation of the partial products produced by the synapse array.

In another aspect, the synapse array is connected to a first group of multiple parallel bus lines, wherein each of the parallel bus lines includes multiple parallel channels for parallel transmission of multiple data bits of the first operand from the first memory block to the synapse array, respectively. The synapse array is connected to a second group of multiple parallel bus lines, wherein each of the parallel bus lines includes multiple channels for transmitting multiple bits of the second operand from the second memory block to the synapse array, respectively.

In another aspect, the synapse array comprises multiple parallel synapse circuits for performing multiple parallel multiplication operations of all bits of the first and second operands. Each of the synapse circuits is connected to the first and second parallel bus lines to simultaneously receive the bits of the first and second operands from the first and second memory blocks, respectively. Each of the synapse circuits comprises multiple parallel synapses, wherein each synapse is configured to simultaneously produce multiple partial products based on the data bits of the first and second operands. Each synapse circuit is connected to two groups of parallel channels such that a first group channels enables transmission of two complementary inputs of the first operand from the first memory block and a second group channels enables parallel transmission of multiple bits of the second operand from the second memory block.

In a general aspect, the synapse circuit further includes a sign selection unit adjacent to the synapse producing the most significant bit of the partial product, the sign selection unit comprising: a pair of parallel input channels Px and Nx connected to the respective first group channels; a pair of parallel output lines P and N connected to a plurality of the multiple parallel synapses arranged in a row of the synapse array; an input port connected to the corresponding one of the second group channels for receiving one sign input bit of the second operand from the second memory block; and, multiple switches operable in response to the sign input bit value of the second operand.

In another aspect, a first group of the multiple switches are configured to connect the input line Px to the output line N and the input line Nx to the output line P when the input port receives a sign bit value of 1 of the second operand. A second group of the multiple switches are configured to connect the input line Px to the output line P and the input line Nx to the output line N when the input port receives a sign bit value of 0 from the second operand. Bit values on the (Px, Nx) channels consist of complementary values (1,0) or (0,1), or all zeros (0,0).

In a general aspect, the synapse comprises four MOS translators, wherein each transistor comprises four MOS transistors to perform a 1-bit multiplication operation of the first and second operands. First and second of the four MOS transistors are serially connected and have gates connected to the respective output lines P and N and connected to a pair of primary and complementary bit lines, respectively. One end of the first transistor is coupled to a primary bit line (BL) and one end of the second transistor is coupled to a complementary bit line (BLB). The first transistor is connected to the primary bit line BL to output a respective 1-bit partial product of the multiplication when the operands A and B have the same sign value; and wherein the second transistor is connected to the complementary bit (BLB) to output a respective 1-bit partial product of the multiplication when the operands A and B have a different sign value. Third and fourth of the four MOS transistors are serially connected, and wherein the third transistor has a gate terminal connected to one of the second group channels connecting the second memory block and the fourth transistor has a gate connected to a reference signal source Vref that can be an analog voltage source having a range of VDD and VSS.

In a general aspect, the synapse includes a first AND gate having a first input connected to the P output line, a second input connected to one of the second group channels, and an output connected to a primary of one paired bit lines; and, a second AND gate having a first input connected to the N output line, a second input connected to the channel the first AND gate is connected, and an output connected to a complementary of the one paired bit lines.

In a general aspect, the neural network engine further includes: a synapse driver configured for connecting the internal memory to the synapse array, wherein the synapse driver is configured to convert a streaming raw input data into two or more pairs of input data to perform multiple 1-bit multiplication in parallel. The synapse driver is configured to generate a pair of bits corresponding to 1-bit of the raw data response to a sign bit value of the raw data received.

BRIEF DESCRIPTION OF THE DRAWINGS

The following drawing parts of the specification are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION OF THE INVENTION

Figure 1:
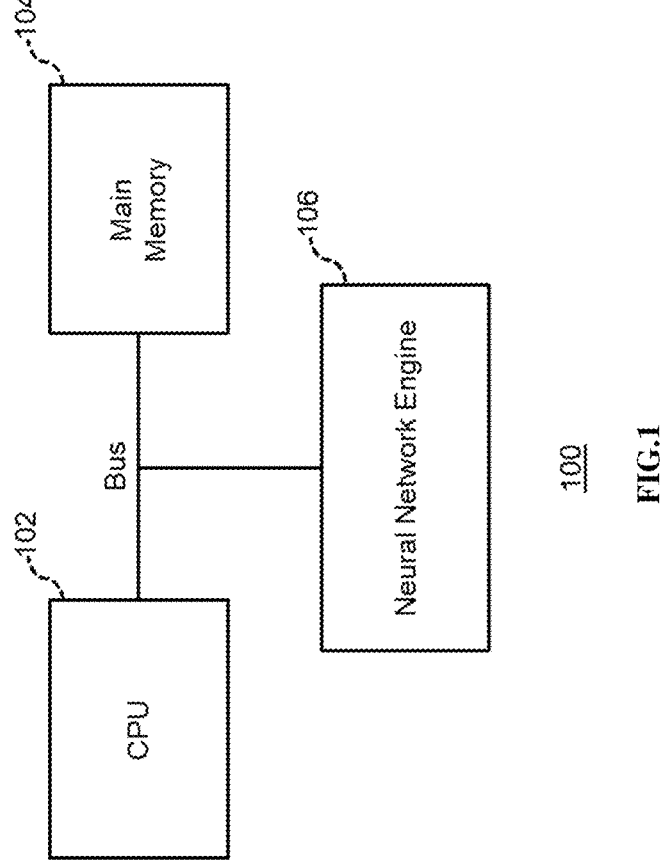
FIG. 1 is a schematic block diagram of a conventional processor configured to perform neural network operations.
Figure 2:
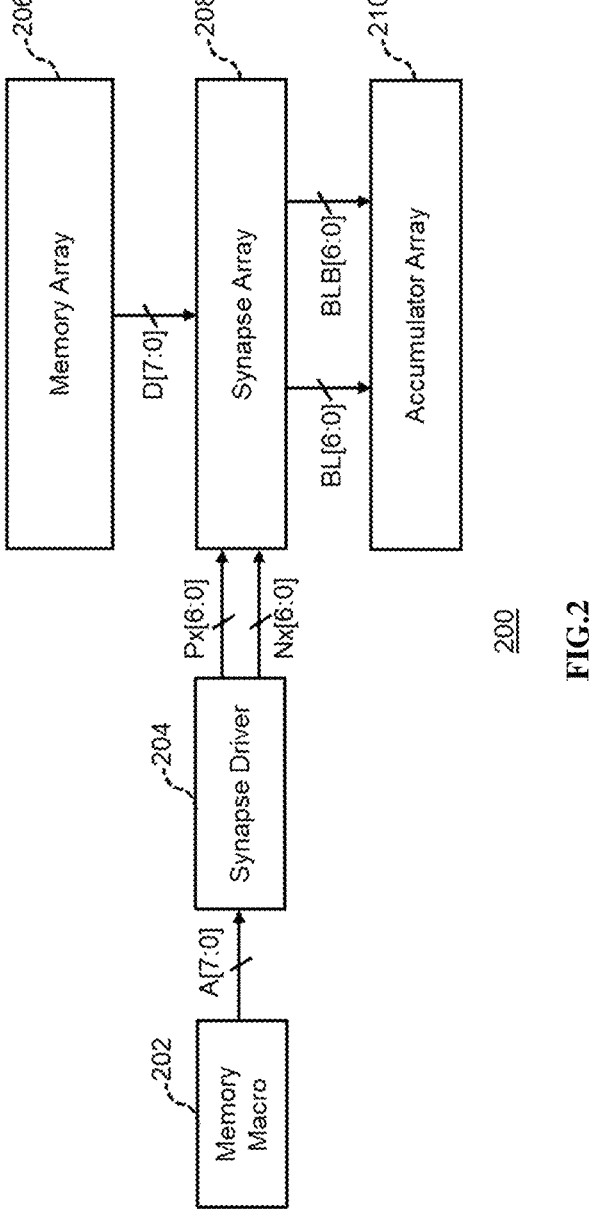
FIG. 2 is a schematic block diagram of a neural network engine configured to perform a multiplication of two operands according to one embodiment of the present invention.

FIG. 2 is a schematic block diagram of a neural network engine configured to perform a multiplication of two operands according to one embodiment of the present invention. The neural network engine 200 can include a memory macro 202, a synapse array 208, a synapse driver 204 connecting the memory macro 202 to the synapse array 208, a memory array 206, and an accumulator array 210.

The memory macro 202 and memory array 206 can store input data suitable for neural network operations. The memory macro 202 and memory array 206 can be an SRAM, DRAM, OTP, MTP, STT-MRAM, PRAM, Flash, ReRAM, FeFET, or others to store key volatile or nonvolatile values as the input data for neural network operations.

The term "A[7:0]" refers to a bit data bus consisting of eight parallel 1-bit channels A[7], A[6], A[7], A[6], . . . , A[0]. This bit data bus is configured to transmit signed raw data from the memory macro 202 to the synapse driver 204. The synapse driver 204 is configured to convert a signed raw bit data from the memory macro 202 to respective unsigned magnitude pairs to transmit to the synapse array 208.

The term "PX[6:0]" refers to a bit data bus consisting of seven 1 bit parallel channels Px[6], Px[5], Px[4], Px[3], . . . , Px[0]. This bit data bus is configured to enable the parallel transfer of the data up to 7-bit when the raw data A[7:0] has a positive value. The term "NX[6:0]" refers to a bus consisting of seven 1-bit parallel channels Nx[6], Nx[5], . . . , Nx[0] enabling the parallel transfer of the data up to 7-bit when the raw data A[7:0] has a negative value.

The synapse driver 204 coordinates the binary values to be transmitted through Px[6:0]" and Nx[6:0] buses such that if the 1-bit channel Px transmits a binary value "1", the paired 1-bit Nx channel transmits a binary value "0". Also, when the 1-bit channel Nx transmits a binary value "1", the paired 1-bit Px channel transmits a binary value "0". Also, the Px and Nx channels transmit binary value "0" responding to the zero-bit raw data received. For example, if the data bus A[7:0] transmits 10000101 (a signed raw bit) to the synapse driver 204, then, the Px[6:0] and Nx[6:0] shall be driven to 0000000 and 0000101, respectively, thus creating seven pairs of binary values for the respective (Px, Nx) channels: (0, 0), (0, 0), (0, 0), (0, 0), (0, 1), (0, 0), (0, 1). Also, if the bus A[7:0] transmits the binary value of 01010101 to the synapse driver 204, then, the Px [6:0] and Nx[6:0] shall be driven to 1010101 and 0000000, thus creating seven pairs of binary values for the respective (Px, Nx) channels: (1, 0), (0, 0), (1, 0), (0, 0), (1, 0), (0, 0), (1, 0).

The memory array 206 can store and supply a set of m-bit data (e.g., operand A) to be computed with the pair of n-bit data (e.g., operand B) from the synapse driver 204. The synapse array 208 comprises a plurality of synapse circuits. Each synapse circuit can generate partial products of a bit-by-bit multiplication between the operands A and B. The term "D[7:0]" refers to a bit data bus consisting of eight input data channels D[7], D[6], D[5], . . . , D[0]. This bit data bus is configured to enable the parallel transfer of the data up to 8-bit from the memory array 206 to the synapse array 208. In addition, the D[7] channel can be used for carrying sign bit data.

The term "BL[6:0]" refers to a total of seven parallel bit lines BL[6], BL[5], BL[4], . . . , BL[0] configured to enable the parallel transfer of seven partial products, which are calculated based on the two positive operands A and B, to the accumulator array 210. The term "BLB[6:0]" refers to a total of seven parallel bit lines BLB[6], BLB[5], BLB[4], . . . , BLB[0] configured to enable the parallel transfer of seven partial products, which are calculated based on one negative operand A or B, to the accumulator array 210.

The accumulator array 210 can produce a final result of the multiplication by summing all partial products from the synapse array 208, wherein the partial products are made between m-bit input data and the n-bit input data.

Figure 3:
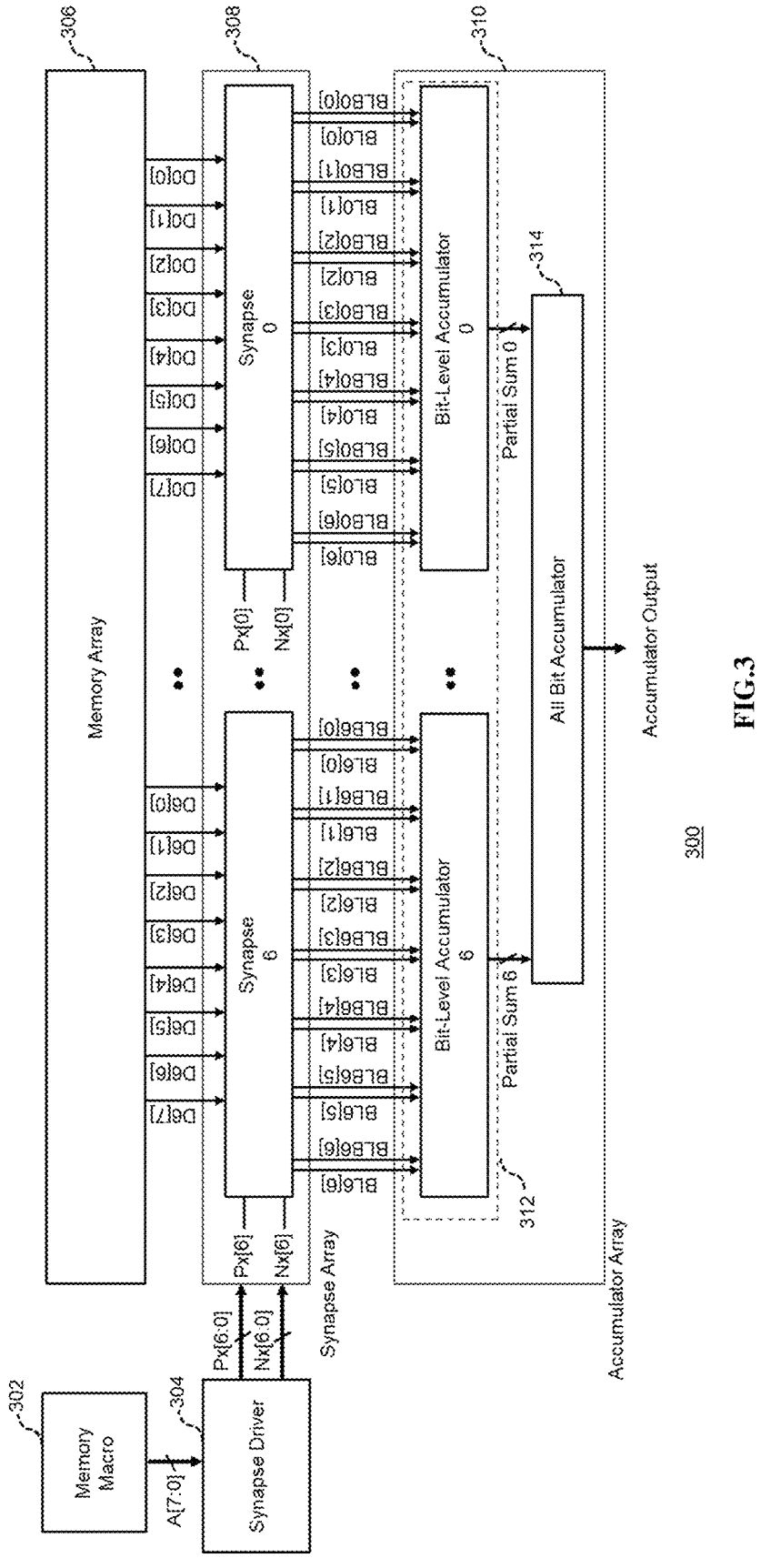
FIG. 3 shows a functional block diagram of the neural network engine of FIG. 2 configured to perform multiplication operation.

FIG. 3 shows a functional block diagram of the neural network engine of FIG. 2 configured to perform multiplication operations.

In the neural network engine 300, the synapse array 308 is configured to produce partial products of (i) an 8-bit multiplicand (with one sign bit) from the memory array 306 and (ii) a 7-bit multiplier pair from the synapse driver 304.

The synapse driver 304 can convert the raw data of A[7:0] for parallel transferring the data up to 7-bit and coordinate the binary values for the buses Px[6:0] and Nx[6:0] For example, when the bus A [7:0] transmits 8-bit raw data (with one sign-bit) 10110101 to the synapse driver 304, this transmitted data is converted into a pair of 7-bit data by excluding the sign bit value: 0000000 and 0110101.

The synapse driver 304 can matches the binary values of the first 7-bit data (0000000) with the binary values of the second 7-bit data (0110101) in the same bit position to generate a total of seven pairs (0, 0), (0, 1), (0, 1), (0, 0), (0, 1), (0, 0), (0, 1), to laterally transmit to synapses 6, 5 . . . 0 via the respective pairs of parallel channels (Px[6],Nx[6]), (Px[5],Nx[5]), (Px[4],Nx[4]), (Px[3],Nx[3]), (Px[2],Nx[2]), (Px[1],Nx[1]), and (Px[0],Nx[0]).

The synapse array 308 can include seven synapse circuits. However, for simplicity of the description, only two synapse circuits, "synapse 6" and "synapse 0" have been depicted to represent the seven synapse circuits in FIG. 3. In addition, a group of synapses for performing the multiplication operations located in each synapse circuit has been omitted from FIG. 3 only for simplicity. The seven synapse circuits (synapse 6, synapse 5, . . . , synapse 0) in the synapse array 308 can produce the respective partial products. Further, each synapse circuit can includes seven parallel synapses (not shown) such that those parallel synapses laterally receive an 8-bit multiplicand through seven eight-bit data buses (i.e., D6[7:0], . . . , D0[7:0]), respectively. The seven synapse circuits are also connected to the seven pairs of channels (Px[6], Nx[6]), (Px[5], Nx[5]), . . . , (Px[0], Nx[0]), respectively, to receive corresponding single bits of the 7-bit multiplier.

In FIG. 3, the synapse 6 is connected to (1) eight input data channels D6[7], D6[6], D6[5], . . . , D6[0] for transferring 8-bit operand A (with one sign bit) from memory macro 302 and (2) two parallel input data channels Px[6] Nx[6] for transferring a first complementary 1-bit data pair associated with 8-bit operand B. Similarly, the synapse 0 is connected to (1) eight input data channels D0[7], D0[6], . . . , D0[0] for transferring 8-bit operand A (with one sign bit) from memory macro 302 and (2) two parallel input data channels Px[0] Nx[0] for transferring a second complementary 1-bit data pair associated with 8-bit operand B.

The seven synapse circuits can produce the respective seven 1-bit partial products based on the 8-bit multiplicand (with one sign bit) and the 7-bit multiplier that is formatted by the synapse driver 304 and transmitted through the parallel Px and Nx channels.

The partial 1-bit product of the positive multiplied value from each synapse in the respective synapse circuit is transmitted via the respective primary bit line BL. The partial product of a negative multiplied value from each synapse is transmitted via the respective complementary bit line BLB. As one example, for the synapse 0 circuit, the bit lines BL0[0] and BLB0[0] are adapted to transmit the partial product pair of 1-bit of D0[0] and 1-bit of Px[0] Nx[0].

Each synapse (not shown) in the seven synapse circuits is configured to send a 1-bit partial product (multiplication product) it has produced to the respective bit-level accumulator via the individual bit line (BL and BLB). Therefore, each synapse circuit (synapse 6, synapse 5, . . . synapse 0) can laterally send seven 1-bit partial products to the respective seven bit-level accumulators 312 through seven pairs of bit lines (BL and BLB). And therefore, the synapse array 308 can laterally send seven 7-bit partial products to the respective seven bit-level accumulators 312 through the seven 7-pairs of bit lines (BL and BLB).

The seven Bit-Level Accumulators 312 (Bit-Level Accumulator 6, . . . , Bit-Level Accumulator 0) can generate seven partial sums by adding up the respective partial products received. The seven bit-level accumulators 312 can sum the partial products from the synapse circuits (synapse 6, synapse 5, . . . , synapse 0) to generate the respective partial sums, respectively.

All Bit Accumulator 314 performs the addition of the partial sums received from the seven Bit-Level Accumulators 312. All Bit Accumulator 314 is configured to output the sum of partial sums generated by the seven bit-level accumulators 312.

Figure 4:
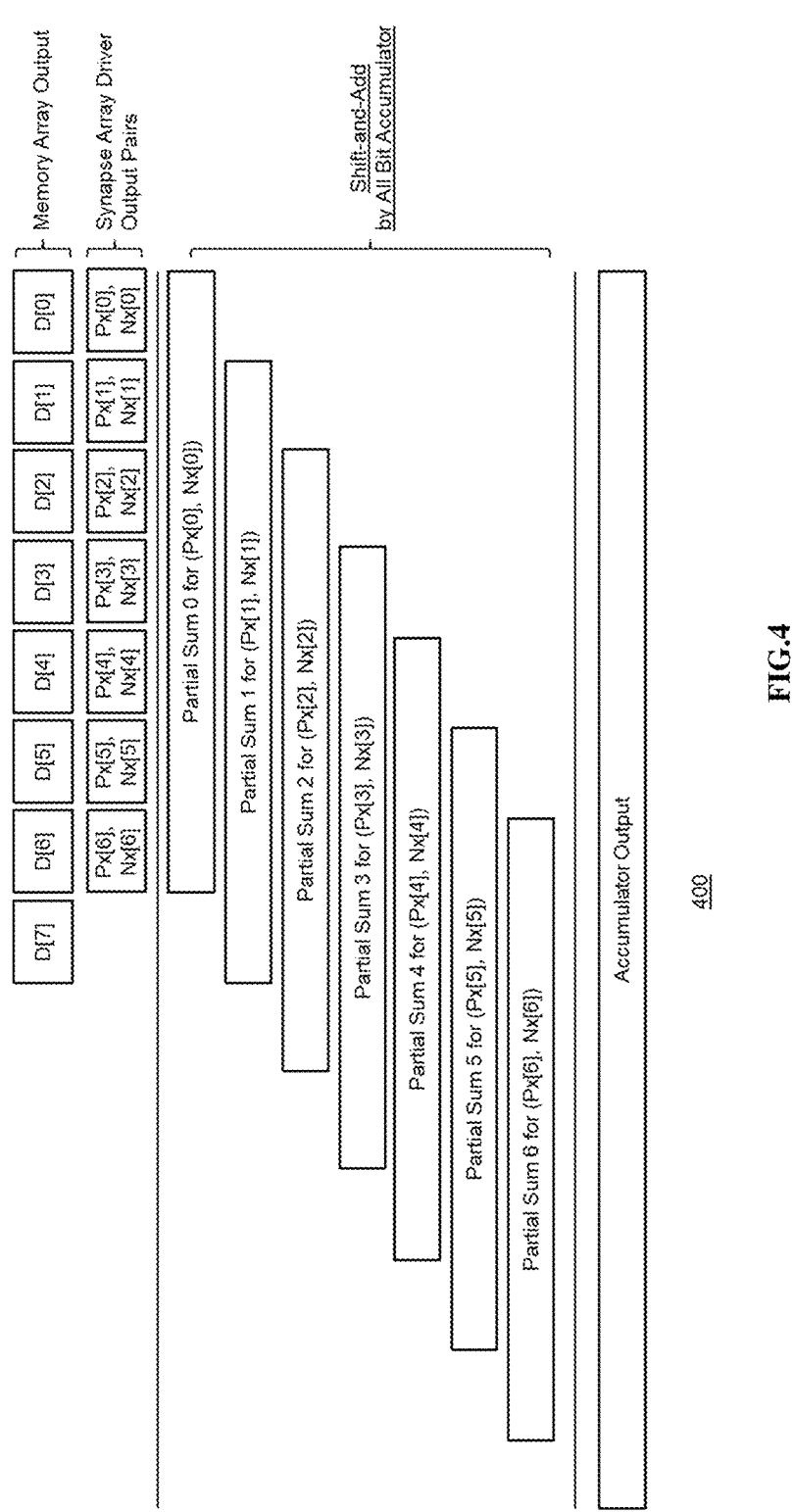
FIG. 4 is a mathematical block diagram illustrating the way of the neural network engine in producing the final result by adding the partial sums in FIG. 3

FIG. 4 is a schematic block diagram and mathematical representation illustrating adding partial sums produced by the synapse array in FIG. 3.

FIG. 4 illustrates a graphical representation form 400 of multiplying (i) an eight-bit value (a multiplicand) of the data D[7], D[6], . . . , D[0] occupying each of the data buses (i.e., D6[7:0], . . . , D0[7:0]) by (ii) a 7-bit multiplier value consisting of the common binary numbers of the seven pairs of Px/Nx buses, (Px[6],Nx[6]), (Px[5],Nx[5]), . . . (Px[0], Nx[0]).

The most significant value of the data D[7] is a sign bit value of the multiplicand. This value (0 or 1) determines whether the multiplier pair data is either (1) in-phase with the multiplicand data for enabling (Px,Nx) channels to be connected to the respective (P,N) lines or (2) in out-phase with the multiplicand data for enabling the (Px,Nx) channels are cross-connected to the respective (N, P) lines, as shown in FIGS. 5.6.

Then, the remaining magnitude bits of the multiplicand in the buses D[6], . . . and D[0] are (1) multiplied by the first bit of the multiplier pair (Px[0], Nx[0]) and summated by the Bit-Level Accumulator 0 to form the first row of the partial product sum (Partial Sum 0), (2) multiplied by the second bit of the multiplier pair in the bus (Px[1], Nx[1]) and summated by the Bit-Level Accumulator 1 to form the second row of the partial product sum (Partial Sum 1), (3) multiplied by the third bit of the multiplier pair in the bus (Px[2], Nx[2]) and summated by the Bit-Level Accumulator 2 to form the third row of partial product sum (Partial Sum 2), and so on until the final bit of the multiplier pair in the bus (Px[6], Nx[6]) produces the last row of partial product sum (Partial Sum 6).

Each row of partial sums after the previous row is shifted relative to the following row by one-bit position are added to obtain a final product of the operands A and B (Accumulator Output) by the All Bit Accumulator 314.

Figure 5:
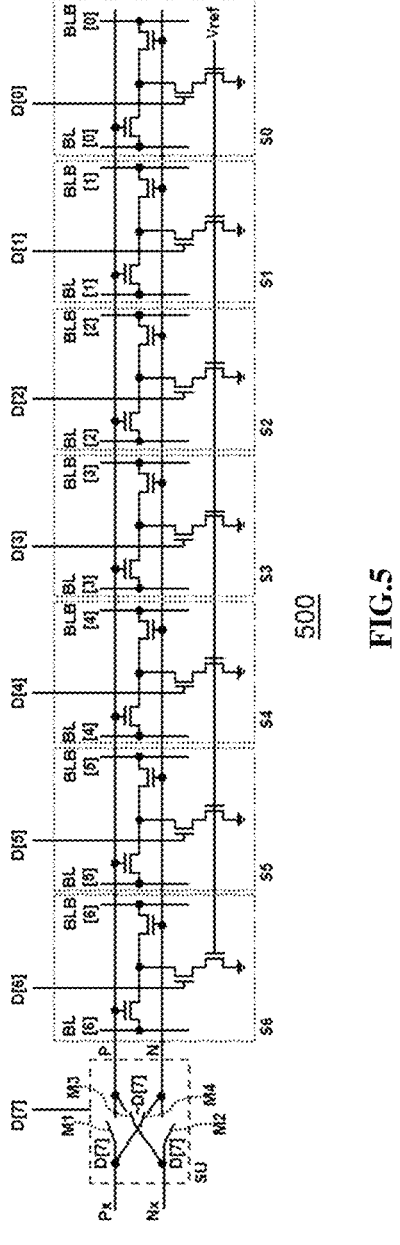
FIG. 5 shows one exemplary synapse circuit in the synapse array of FIG. 3.

FIG. 5 shows one exemplary synapse circuit of FIG. 3.

In FIG. 5, a synapse circuit 500 includes a sign selection unit SU, and seven parallel synapses (S6, S5, . . . , S0) arranged between two parallel data input lines P, N. Note that one synapse array can be configured with seven parallel synapse circuits, as shown in FIG. 3. Also note that FIG. 3 has shown these seven parallel synapse circuits (Synapse 6, Synapse 5 . . . Synapse 0) are connected to (i) the seven buses D6[7:0], . . . , D0[7:0]), respectively, and (ii) pairs of (Px, Nx) channels (Px[6],Nx[6]), (Px[5],Nx[5]), . . . , (Px[0],Nx[0]), respectively.

FIG. 5 shows one pair of (Px,Nx) channels connected to one synapse circuit. In FIG. 5, "Px" and "Nx" channels (as equivalent to any one of the pair of (Px, Nx) channels) can be connected to, disconnected from, or cross-connected to the parallel P/N lines at the synapse circuit, respectively.

The sign selection unit SU includes four switches (MOS transistors) M1, M2, M3, and M4. Each of the four switches can be activated and deactivated in response to a sign input bit value on a connected data channel D[7]. The M1 and M2 activated by a sign bit with a value "0" on the D[7] can connect the (Px, Nx) channels to the P and N lines. The bit values on the (Px, Nx) channels consist of complementary values (1,0) or (0,1), or all zeros (0,0). And these pairs of values on the (Px, Nx) channels are transmitted to (P, N) data input lines, respectively, through the activated M1 and M2. The M3 and M4 activated by a sign bit with a value "1" on the D[7] channel can cross-connect the (Px,Nx) channels to the (P, N) lines, respectively. The bit values (1,0) and (0,1) of the (Px, Nx) channels will be converted to (0,1) and (1,0) on the (P, N) lines, respectively.

The seven parallel synapses S6, S5, . . . S0 are connected to respective parallel input data channels D[6], D[6], . . . , D[0] that are connected to the memory array 306. The synapses are connected to respective pairs of bit lines (BL[6],BLB[6]), (BL[5],BLB[5]), . . . , (BL[0],BLB[0]) to output the products of multiplication based on respective input bit data.

Each synapse S6, S5, . . . , 0 includes four MOS transistors. First and second serially transistors have the gates coupled to the P and N lines, respectively, to receive one bit (1-bit) of the multiplier (operand B). One end of the first transistor is coupled to a primary bit line, and one end of the second transistor is coupled to a complementary bit line (BLB). The first transistor is connected to the primary bit line BL to output a respective 1-bit partial product of the multiplication when the operands A and B have the same sign value. The second transistor is connected to the complementary bit (BLB) to output a respective 1-bit partial product of the multiplication when the operands A and B have a different sign value.

Third and fourth serially connected transistors have gates connected to one input data channel (D[6], . . . , D[0]) and a reference signal source Vref, respectively. The third transistor has a gate connected to a respective data bus D[6], D[7], . . . D[0] to receive a single bit of the multiplicand data (A operand). One end of the third transistor is connected to a common node shared by the first and second transistors. The fourth transistor has a gate connected to a common node having reference signal Vref. The reference signal source Vref can be an analog voltage source having a range of VDD and VSS. One end of the fourth transistor is connected to the ground.

With this circuit design, a multiplication and accumulation engine can be tightly connected to a coupled memory block (i.e., memory macro or memory array) having a large density. As a result, a neural network engine incorporating such a multiplication and accumulation engine with the tightly connected coupled memory can have higher area efficiency and performance with improved scalability for various process technologies compared to the case that the non-scalable memory element is integrated into the synapse of the neural network engine. To save power, lower than a regular supply voltage can be applied to the input signal levels connected to the synapse here. Note multiplicative output from synapse has tolerance to the supply noise when the output is used for neural network operation. So, potential variation from the reduced power supply shall be acceptable.

Figure 6:
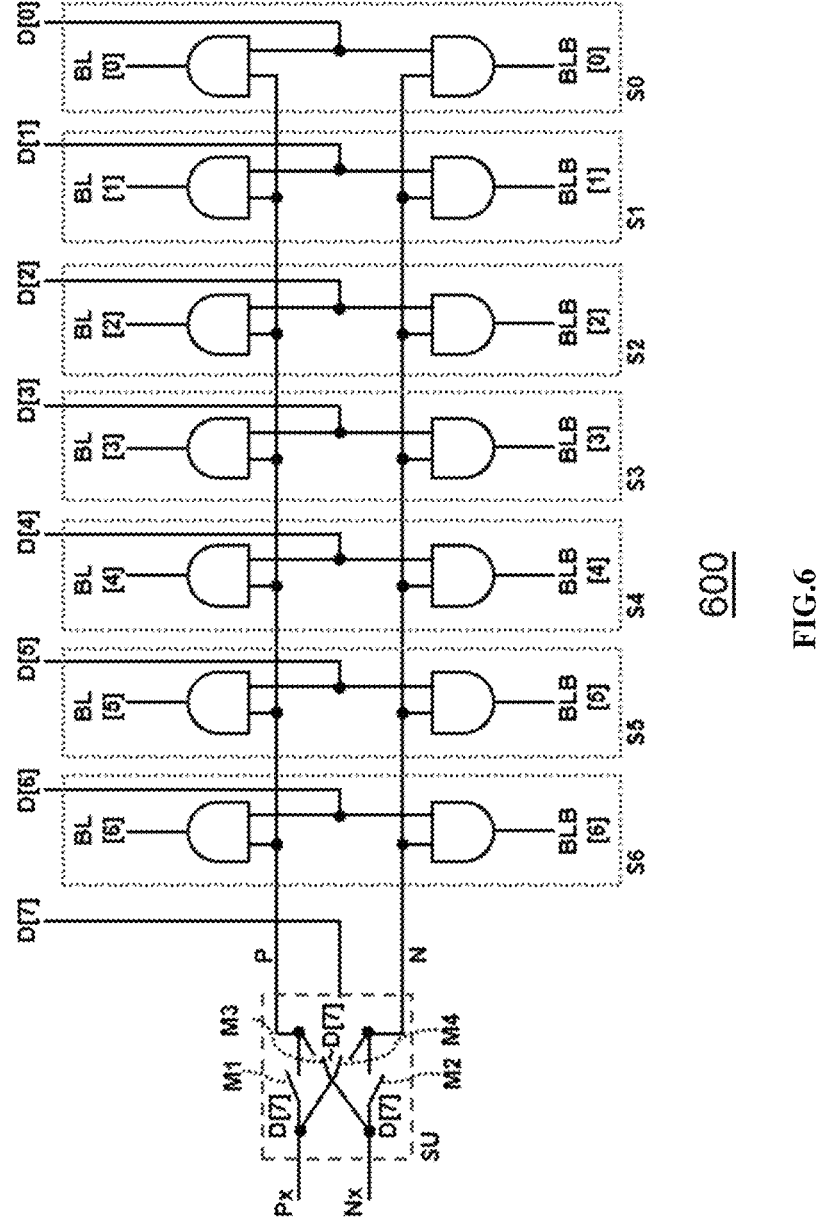
FIG. 6 shows another exemplary synapse circuit in the synapse array of FIG. 3

FIG. 6 shows a block schematic diagram of another synapse circuit (type II) in FIG. 3.

In FIG. 6, a synapse circuit 600 includes a sign selection unit SU, and seven parallel synapses (S6, S5, . . . , S0) arranged between two parallel data input lines P, N. FIG. 6 shows one pair of (Px,Nx) channels connected to one synapse circuit. In FIG. 6, "Px" and "Nx" channels (as equivalent to any one of the pair of (Px, Nx) channels) can be connected to, disconnected from, or cross-connected to the parallel P/N lines at the synapse circuit, respectively.

The sign selection unit SU includes four switches (MOS transistors) M1, M2, M3, and M4. Each of the four switches can be activated and deactivated in response to a sign input bit value on a connected data channel D[7]. The M1 and M2 activated by a sign bit with a value "0" on the D[7] can connect the (Px, Nx) channels to the P and N lines. The bit values on the (Px, Nx) channels consist of complementary values (1,0) or (0,1), or all zeros (0,0). And these pairs of values on the (Px, Nx) channels are transmitted to (P, N) data input lines, respectively, through the activated M1 and M2. The M3 and M4 activated by a sign bit with a value "1" on the D[7] channel can cross-connect the (Px,Nx) channels to the (P, N) lines, respectively. The bit values (1,0) and (0,1) of the (Px, Nx) channels will be converted to (0,1) and (1,0) on the (P, N) lines, respectively.

The seven parallel synapses S6, S5, . . . , S0 are connected to respective parallel input data channels D[6], D[6], . . . , D[0] that are connected to the memory array 306. The synapses are connected to respective pairs of bit lines (BL[6],BLB[6]), (BL[5],BLB[5]), . . . , (BL[0],BLB[0]) to output the products of multiplication based on respective input bit data.

Each synapse S6, S5, . . . , S0 includes one pair of AND Gates sharing one common input node that is connected to one input data channel D[6], D[6], . . . , D[0]. A first paired AND Gate has a first input terminal connected to the P line, a second input terminal connected to the respective data channel (D[6], D[6], . . . , D[0]), and an output terminal connected to the respective primary bit line (BL[6], BL[5], . . . , BL[0]). A second paired AND Gate has a first input terminal connected to the N line, a second input terminal connected to its corresponding digital data channel (D[6], D[6], . . . , D[0]), and an output terminal connected to its corresponding complementary bit line (BLB[6], BLB [5], . . . , BLB[0]).

With this circuit design, a multiplication and accumulation engine can be tightly connected to a coupled memory block (i.e., memory macro or memory array) having large density. As a result, a neural network engine incorporating such a multiplication and accumulation engine with the tightly connected coupled memory can have higher area efficiency and performance with improved scalability for various process technologies compared to the case that the non-scalable memory element is integrated in the synapse of the neural network engine. To save power, lower than a regular supply voltage can be applied to logic gates in the synapse here. Note multiplicative output from synapse has tolerance to the supply noise when the output is used for neural network operation. So, potential variation from the reduced power supply shall be acceptable. Note that a significant number of elements in (P, N) lines or (D0~D7) channels can have low signal when computing neural network operation using sparse matrices or vectors. Since the AND gate doesn't activate unless both input signals of the gate are high, activation frequency is low and reduces power consumption. Even though we show logical AND operation here, other types of logic gates can be implemented using NAND, XNOR, XOR, NOR, OR, INV to perform the similar logical operations here. For example, when two's complement representation of numbers is used, AND gate can be replaced with XNOR gate. In this case, (Px, Nx) lines instead of (P, N) lines can be directly connected to the XNOR gates without a sign selection block.

Figure 7:
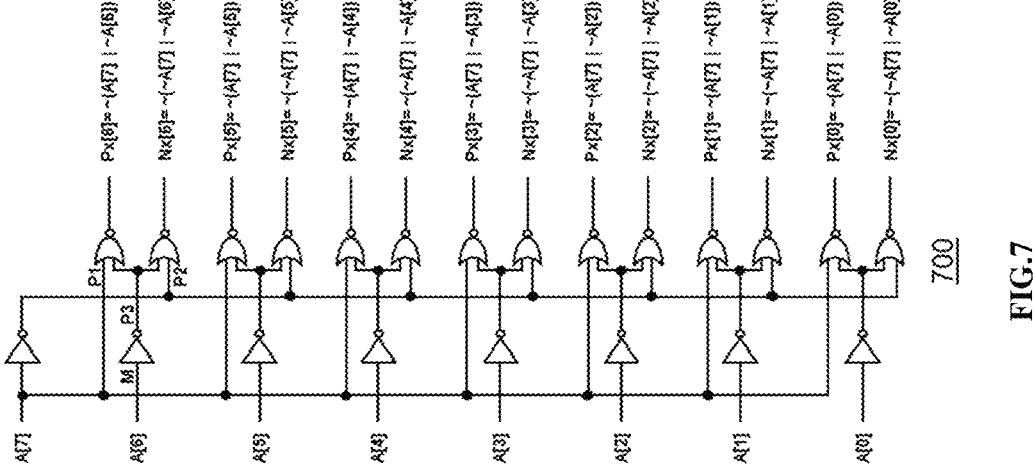
FIG. 7 shows one schematic representation of the synapse driver of FIG. 3.

FIG. 7 shows one schematic representation of the synapse driver of FIG. 3.

In FIG. 7, an exemplary 7-bit synapse driver circuit includes 8 NOT Gates, as input terminal, for receiving input signals from the memory macro. 14 NOR Gates are designed, as output terminal, for outputting the respective output signals to the synapse array. Each NOR gate has two inputs, one of which is connected to an input of the other NOR Gate in a pair by sharing a common node.

Input data with up to 8 bits from the Memory macro on parallel input channels A[7], A[6] . . . A[0] can be converted to respective groups of binary pairs on the connected channel pairs (Px[6], Nx[6]), . . . , (Px[0], Nx[0]). Those converted pairs of the binary inputs are transmitted to the corresponding synapse circuits as shown in FIG. 3. In addition, a sign bit of the raw input data from the memory macro is removed in that the converted output data contains the absolute value of the raw input data.

For this purpose, for example, a sign-bit at data bus A[7] is inputted to the NOT Gate and the NOR Gates as input P1, both Gates being connected to the data bus A[7]. The output of the NOT Gate is then inputted to the connected NOR Gates, as input P2. The magnitude bit data (up to 7-bit) at the remaining data buses A[6], A[5] . . . A[0] can be inputted to the connected NOT Gates, respectively, as input M. The outputs of the NOT Gates are then imputed to the connected NOR Gates, as input P3.

The Boolean notations for each pair of NOR Gates indicate that a sign bit data at A[7] bus selects the NOR gate in the pair to activate when receiving a magnitude bit signal. Depending on the magnitude bit value of A[6]—A[0], the synapse input signals can provide an activated signal (if the magnitude bit is high) or not (if the magnitude bit is low).

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:

1. A neural network engine to perform computations, comprising:
   a first memory block configured to provide a first operand;
   a second memory block configured to provide a second operand;
   a synapse array physically distinct from the first memory block and second memory block comprising a plurality of synapse circuit, wherein each synapse circuit is configured to:
   receive first complementary input signals representing the first operand;
   produce a partial product based on the first operand and the second operand; and
   output complementary partial product signals corresponding to the partial product; and,
   one or more pairs of differential bit lines, wherein each pair of the one or more differential bit lines is configured to carry the complementary partial product signals from each corresponding synapse circuit; and
   an accumulator array coupled to the synapse array via the one or more pairs of differential bit lines, the accumulator configured to perform summation of the complementary partial products signals via the one or more pairs of differential bit lines.

2. The neural network engine of claim 1, wherein the synapse array is connected to a first group of multiple parallel bus lines, wherein each of the parallel bus lines includes multiple parallel channels for parallel transmission of multiple data bits of the first operand from the first memory block to the synapse array, respectively.

3. The neural network engine of claim 2, wherein the synapse array is connected to a second group of multiple parallel bus lines, wherein each of the parallel bus lines includes multiple channels for transmitting multiple bits of the second operand from the second memory block to the synapse array, respectively.

4. The neural network engine of claim 3, wherein the synapse circuits is configured to performing multiple parallel multiplication operations of all bits of the first and second operands.

5. The neural network engine of claim 4, wherein each of the synapse circuits is connected to the first and second parallel bus lines to simultaneously receive the bits of the first and second operands from the first and second memory blocks, respectively.

6. The neural network engine of claim 5, wherein each of the synapse circuits comprises multiple parallel synapses, wherein each synapse is configured to simultaneously produce multiple partial products based on the data bits of the first and second operands.

7. The neural network engine of claim 6, wherein each synapse circuit is connected to two groups of parallel channels such that a first group channels enables transmission of two complementary inputs of the first operand from the first memory block and a second group channels enables parallel transmission of multiple bits of the second operand from the second memory block.

8. The neural network engine of claim 7, wherein the synapse circuit further comprises a sign selection unit adjacent to the synapse producing the most significant bit of the partial product, the sign selection unit comprising:

a pair of parallel input channels Px and Nx connected to the respective first group channels;

a pair of parallel output lines P and N connected to a plurality of the multiple parallel synapses arranged in a row of the synapse array;

an input port connected to the corresponding one of the second group channels for receiving one sign input bit of the second operand from the second memory block; and, multiple switches operable in response to the sign input bit value of the second operand.

9. The neural network engine of claim 8, wherein a first group of the multiple switches are configured to connect the input line Px to the output line N and the input line Nx to the output line P when the input port receives a sign bit value of 1 of the second operand.

10. The neural network engine of claim 9, wherein a second group of the multiple switches are configured to connect the input line Px to the output line P and the input line Nx to the output line N when the input port receives a sign bit value of 0 from the second operand.

11. The neural network engine of claim 10, wherein bit values on the (Px, Nx) channels consist of complementary values (1,0) or (0,1), or all zeros (0,0).

12. The neural network engine of claim 11, wherein the synapse comprises four MOS transistors, wherein each transistor comprises four MOS transistors to perform a 1-bit multiplication operation of the first and second operands.

13. The neural network engine of claim 12, wherein first and second of the four MOS transistors are serially connected and have gates connected to the respective output lines of the sign selection unit P and N.

14. The neural network engine of claim 13, wherein one end of the first transistor is coupled to a primary bit line (BL) of the differential bit lines and one end of the second transistor is coupled to a complementary bit line (BLB) of the differential bit lines.

15. The neural network engine of claim 14, wherein the first transistor is connected to the primary bit line BL to output a respective 1-bit partial product of the multiplication when the operands A and B have the same sign value; and wherein the second transistor is connected to the complementary bit (BLB) to output a respective 1-bit partial product of the multiplication when the operands A and B have a different sign value.

16. The neural network engine of claim 15, wherein third and fourth of the four MOS transistors are serially connected, and wherein the third transistor has one end connected to the first and second transistors of the four MOS transistors and a gate terminal connected to one of the second group channels connecting the second memory block and the fourth transistor has grounded one end and a gate connected to a reference signal source Vref that is configured to an analog voltage source having a range of VDD and VSS.

17. The neural network engine of claim 11, wherein the synapse comprising:

a first AND gate having a first input connected to the P output line of the sign selection unit, a second input connected to one of the second group channels, and an output connected to a primary of one paired bit lines; and, a second AND gate having a first input connected to the N output line of the sign selection unit, a second input connected to the channel the first AND gate is connected, and an output connected to a complementary of the one paired bit lines.

18. The neural network engine of claim 1, further comprising:

a synapse driver configured for connecting the internal memory to the synapse array, wherein the synapse driver is configured to convert a streaming raw input data into two or more pairs of input data to perform multiple 1-bit multiplication in parallel.

19. The neural network engine of claim 11, wherein the synapse driver is configured to generate a pair of bits corresponding to 1-bit of the raw data response to a sign bit value of the raw data received.

* * * * *